US009064501B2

(12) United States Patent
Yamada et al.

(10) Patent No.: US 9,064,501 B2
(45) Date of Patent: Jun. 23, 2015

(54) SPEECH PROCESSING DEVICE AND SPEECH PROCESSING METHOD

(75) Inventors: Maki Yamada, Kanagawa (JP); Mitsuru Endo, Tokyo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 235 days.

(21) Appl. No.: 13/816,502

(22) PCT Filed: Sep. 14, 2011

(86) PCT No.: PCT/JP2011/005173

§ 371 (c)(1), (2), (4) Date: Feb. 12, 2013

(87) PCT Pub. No.: WO2012/042768

PCT Pub. Date: Apr. 5, 2012

(65) Prior Publication Data

US 2013/0144622 A1 Jun. 6, 2013

(30) Foreign Application Priority Data

Sep. 28, 2010 (JP) ................................ 2010-217192

(51) Int. Cl.
*G10L 11/06* (2006.01)
*G10L 15/20* (2006.01)
(Continued)

(52) U.S. Cl.
CPC ................. *G10L 25/48* (2013.01); *G10L 25/00* (2013.01); *G10L 2025/783* (2013.01);
(Continued)

(58) Field of Classification Search
USPC .......................................................... 381/313
See application file for complete search history.

(56) References Cited

U.S. PATENT DOCUMENTS 7,117,149 B1 * 10/2006 Zakarauskas ................. 704/233
7,617,094 B2 * 11/2009 Aoki et al. .................... 704/206
(Continued)

FOREIGN PATENT DOCUMENTS

EP 1 453 287 9/2004
JP 2004-133403 4/2004
(Continued)

OTHER PUBLICATIONS

International Search Report issued Oct. 25, 2011 in International (PCT) Application No. PCT/JP2011/005173.
(Continued)

*Primary Examiner* — Richard Zhu
(74) *Attorney, Agent, or Firm* — Wenderoth, Lind & Ponack, L.L.P.

(57) ABSTRACT

A speech processing device which can accurately extract a conversation group from among a plurality of speakers, even when a conversation group formed of three or more people is present. This device (400) comprises: a spontaneous speech detection unit (420) and a direction-specific speech detection unit (430) which separately detect, from a sound signal, uttered speech from the speakers; a conversation establishment level calculation unit (450) which calculates a conversation establishment level for each separated segment of the time being determined, for all of the pairings of two people, on the basis of the detected uttered speech; an extended-period characteristic amount calculation unit (460) which calculates an extended-period characteristic amount for the conversation establishment level of the time being determined, for each pairing; and a conversation-partner determination unit (470) which extracts a conversation group which forms a conversation on the basis of the calculated extended-period characteristic amount.

8 Claims, 10 Drawing Sheets

(51) Int. Cl.

| | |
|---|---|
| ***G10L 21/00*** | (2013.01) |
| ***G10L 25/48*** | (2013.01) |
| ***G10L 25/00*** | (2013.01) |
| ***H04R 25/00*** | (2006.01) |
| *G10L 25/78* | (2013.01) |
| *G10L 25/06* | (2013.01) |
| *G10L 21/0208* | (2013.01) |
| *G10L 21/06* | (2013.01) |

(52) U.S. Cl.
CPC ...... *G10L 25/06* (2013.01); *G10L 2021/02087* (2013.01); *G10L 25/78* (2013.01); *G10L 2021/065* (2013.01); *H04R 25/407* (2013.01); *H04R 25/552* (2013.01); *H04R 25/558* (2013.01); *H04R 2225/43* (2013.01)

(56) References Cited

U.S. PATENT DOCUMENTS

| | | | | |
|---|---|---|---|---|
| 8,126,705 | B2 * | 2/2012 | Aoki et al. | 704/206 |
| 8,306,823 | B2 * | 11/2012 | Okamoto et al. | 704/270 |
| 8,498,435 | B2 * | 7/2013 | Yamada et al. | 381/313 |
| 2008/0243494 | A1 | 10/2008 | Okamoto et al. | |
| 2009/0058611 | A1 * | 3/2009 | Kawamura et al. | 340/10.1 |
| 2011/0305345 | A1 * | 12/2011 | Bouchard et al. | 381/23.1 |
| 2012/0020505 | A1 | 1/2012 | Yamada et al. | |

FOREIGN PATENT DOCUMENTS

| | | |
|---|---|---|
| JP | 2005-157086 | 6/2005 |
| JP | 2005-202035 | 7/2005 |
| JP | 2008-242318 | 10/2008 |
| WO | 02/085066 | 10/2002 |
| WO | 2009/104332 | 8/2009 |
| WO | 2011/105003 | 9/2011 |

OTHER PUBLICATIONS

European Search Report, issued Jan. 23, 2014 in a European application that is a foreign counterpart to the present application.

Paul M. Aoiki et al., “The Mad Hatter’s Cocktail Party: A Social Mobile Audio Space Supporting Multiple Simultaneous Conversations”, Conference on Human Factors in Computing Systems, Ft. Lauderdale, FL, pp. 425-432; XP-002276417, DOI: 10.1145/642611.642686, ISB: 978-1-58113-630-2; Apr. 2003.

* cited by examiner

SPEECH PROCESSING DEVICE AND SPEECH PROCESSING METHOD

TECHNICAL FIELD

The present invention relates to a speech processing device and a speech processing method that detect speech from multiple speakers.

BACKGROUND ART

Conventional techniques to extract a group that holds conversation (hereinafter, referred to as "conversation group") from a plurality of speakers have been proposed for the purpose of directivity control used in hearing aids and teleconferencing apparatuses (for example, see PTL 1).

The technique described in PTL 1 (hereinafter, referred to as "conventional technique") is based on a phenomenon that sound periods are alternately detected from two speakers in conversation. Under this assumption, the conventional technique calculates the degree of established conversation between two speakers on the basis of whether sound and silent periods alternate.

Specifically, the conventional technique raises the degree of established conversation if one of the two speakers gives sound and the other is silent for each unit time period; on the other hand, the technique lowers the degree if both speakers give sound or are silent for each unit time period. The conventional technique then determines the established conversation between those two speakers if the resultant degree in determination time periods is equal to or greater than a threshold.

This conventional technique allows two persons in conversation to be extracted from a plurality of speakers.

CITATION LIST

Patent Literature

PTL 1

Japanese Patent Application Laid-Open No. 2004433403

SUMMARY OF INVENTION

Technical Problem

Unfortunately, such a conventional technique has low accuracy in the extraction of a conversation group of three or more speakers.

It is because one speaking person and a plurality of silent persons are detected within almost of all unit time periods in conversation among three persons or more and the degree of established conversation is low between the silent speakers. Alternatively, if a conversation group of three speakers or more includes a substantial listener who barely speaks, the degree of established conversation is low between the silent person and the other speakers.

An object of the present invention is to provide a speech processing device and a speech processing method that can extract a conversation group of three or more speakers from a plurality of speakers with high accuracy.

Solution to Problem

A speech processing device according to the present invention comprises: a speech detector that detects speech of individual speakers from acoustic signals; an established-conversation calculator that calculates degrees of established conversation of all pairs of the speakers in individual segments defined by dividing a determination time period, on the basis of the detected speech; a long-time feature calculator that calculates a long-time feature of the degrees of established conversation within the determination time period for each of the pairs; and a conversational-partner determining unit that extracts a conversation group holding conversation from the speakers, on the basis of the calculated long-time feature.

A speech processing method according to the present invention comprises: detecting speech of individual speakers from acoustic signals; calculating degrees of established conversation of all pairs of the speakers in individual segments defined by dividing a determination time period, on the basis of the detected speech; calculating a long-time feature of the degrees of established conversation within the determination time period for each of the pairs; and extracting a conversation group holding conversation from the speakers on the basis of the calculated long-time feature.

Advantageous Effects of Invention

According to the present invention, a conversation group of three or more speakers can be extracted from a plurality of speakers with high accuracy.

DESCRIPTION OF EMBODIMENTS

An embodiment of the present invention will now be described in detail with reference to the accompanying drawings. This exemplary embodiment applies the present invention to a conversational partner identifying section used for the directivity control of a hearing aid.

Figure 1:
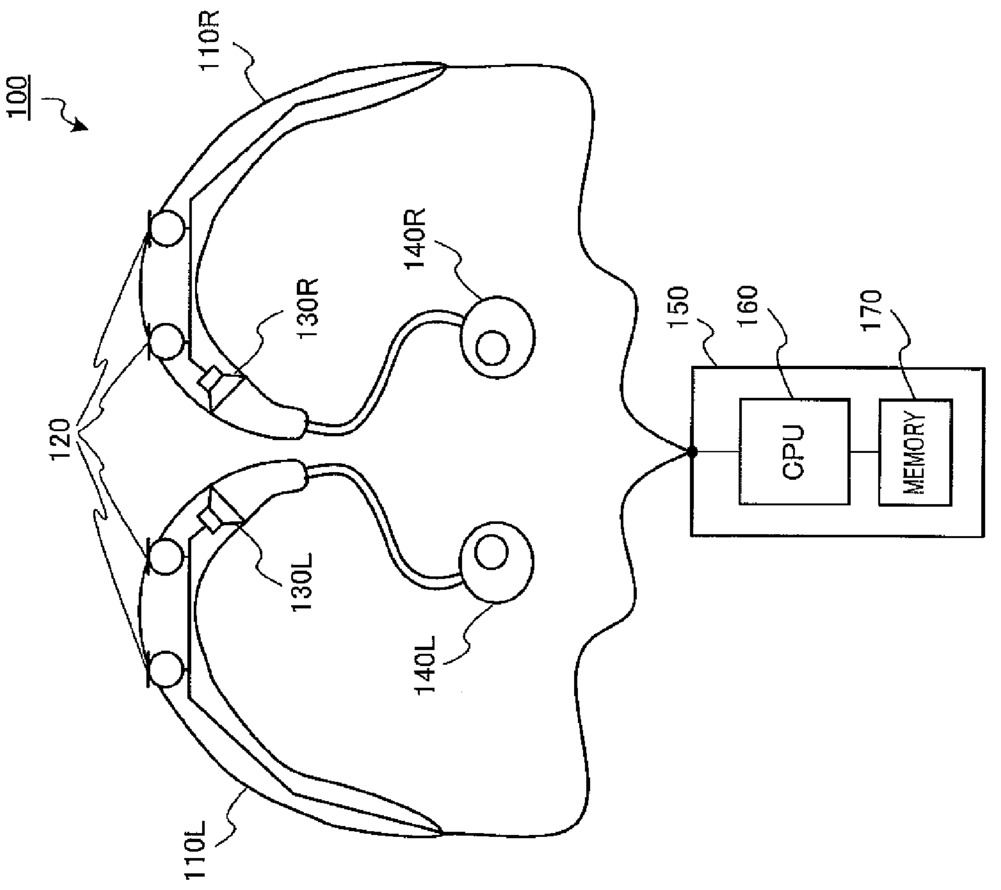
FIG. 1 illustrates the configuration of a hearing aid including a speech processing device according to an embodiment of the present invention.

FIG. 1 illustrates the configuration of a hearing aid including a speech processing device according to the present invention.

As illustrated in FIG. 1, hearing aid 100 is a binaural hearing aid and includes hearing aid cases 110L and 110R to fit behind the left and right external ears, respectively, of a user.

Left and right cases 110L and 110R each have two top microphones arranged in a line, which catch surrounding sound. The total four microphones, consisting of the right two and the left two, define microphone array 120. The four microphones are located at predetermined positions with respect to the user wearing hearing aid 100.

Left and right cases 110L and 110R are also provided with speakers 130L and 130R, respectively, that output sounds adjusted for hearing-assistance. Left and right speakers 130L and 130R are also connected via tubes with ear tips 140L and 140R to fit in the inner ears, respectively.

Hearing aid 100 also includes remote control device 150 wire-connected to hearing aid microphone array 120 and speakers 130L and 130R.

Remote control device 150 has CPU 160 and memory 170 therein. CPU 160 receives speech picked up by microphone array 120 and executes a control program pre-stored in memory 170. Thereby, CPU 160 performs directivity control processing and hearing-assistance processing on four-channel acoustic signals input via microphone array 120.

The directivity control processing controls the directions of the four-channel acoustic signals from microphone array 120 in order to enable the user to readily hear the speech of a conversational partner. The hearing-assistance processing amplifies the gain in a frequency band in which the hearing ability of the user has lowered and outputs the resultant speech through speakers 130L and 130R such that the user can readily hear the speech of the conversational partner.

Hearing aid 100 allows the user to hear speech that is easy-to-hear from the conversational partner through ear tips 140L and 140R.

Figure 2A:
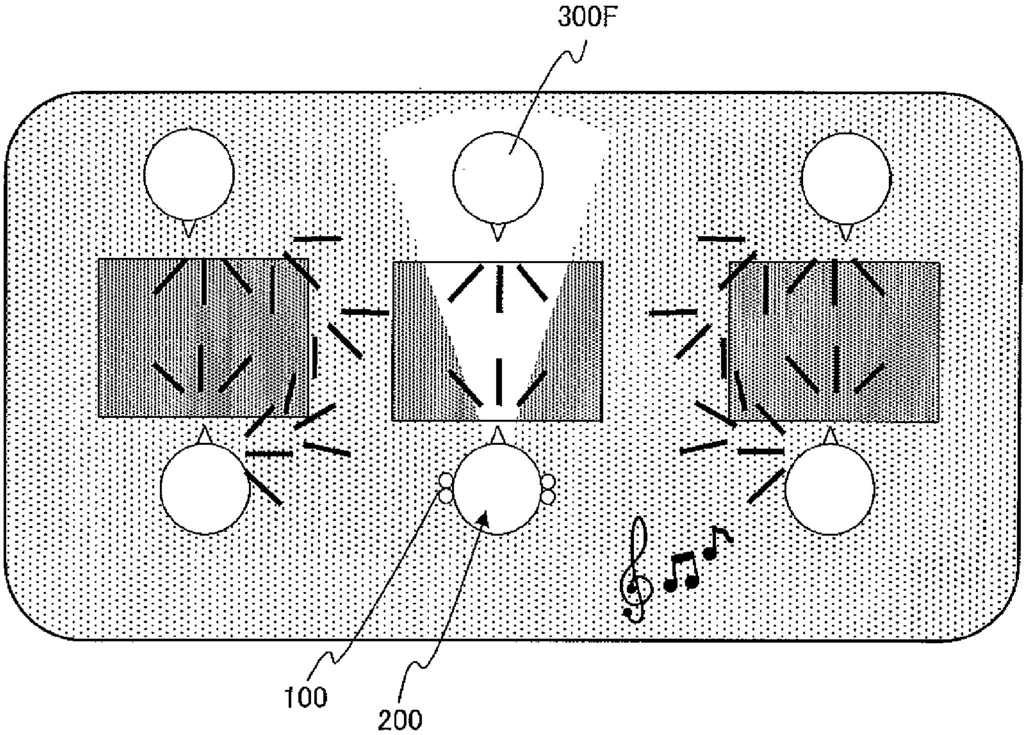
FIGS. 2A and 2B illustrate example environments of use of the hearing aid according to the embodiment.
Figure 2B:
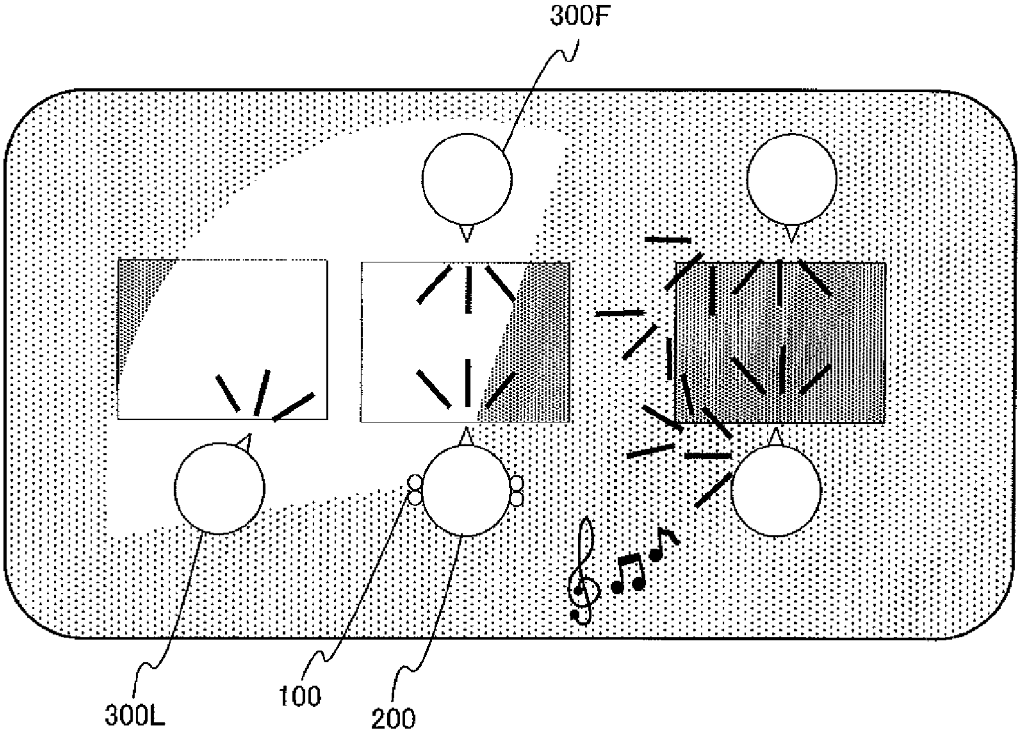

FIGS. 2A and 2B illustrate example environments of use of hearing aid 100.

As illustrated in FIG. 2A and FIG. 2B, user 200 wearing binaural hearing aid 100 talks with speaker 300 such as a friend in a noisy environment such as a restaurant. FIG. 2A illustrates the case in which user 200 talks with only speaker 300F in front of the user. FIG. 2B shows the case in which user 200 talks with speaker 300F in front thereof and speaker 300L on the left thereof.

In the case shown in FIG. 2A, hearing aid 100 should achieve maximum possible filtering-out of speech from left-hand and right-hand people and be directed toward a narrow front range to facilitate the hearing of the speech from facing speaker 300F.

In the case shown in FIG. 2B, hearing aid 100 should be directed toward a wide range that covers the front and left to facilitate the hearing of the speech from facing speaker 300F and left-hand speaker 300L.

Such directivity control enables user 200 to clearly hear the speech of a conversational partner even in a noisy environment. The directivity control depending on the direction from which the speech of a conversational partner comes requires specifying the direction. For example, user 200 may manually determine the direction.

Unfortunately, the operation is complicated. Elderly people and children may make mistakes during operation, and thereby hearing aids may be wrongly directed, which may aggravate the difficulty in hearing.

For this reason, CPU 160 of hearing aid 100 automatically extracts a conversational partner of user 200 from surrounding speakers. CPU 160 of hearing aid 100 then determines the directivity for receiving speech via microphone array 120 (hereinafter, referred to as "directivity of microphone array 120") toward the extracted conversational partner.

This extraction processing can extract even two or more conversational partners with high accuracy. A feature for achieving this processing is referred herein to as a speech processing device.

The configuration of the speech processing device and the processing for extracting a conversational partner will now be described in detail.

Figure 3:
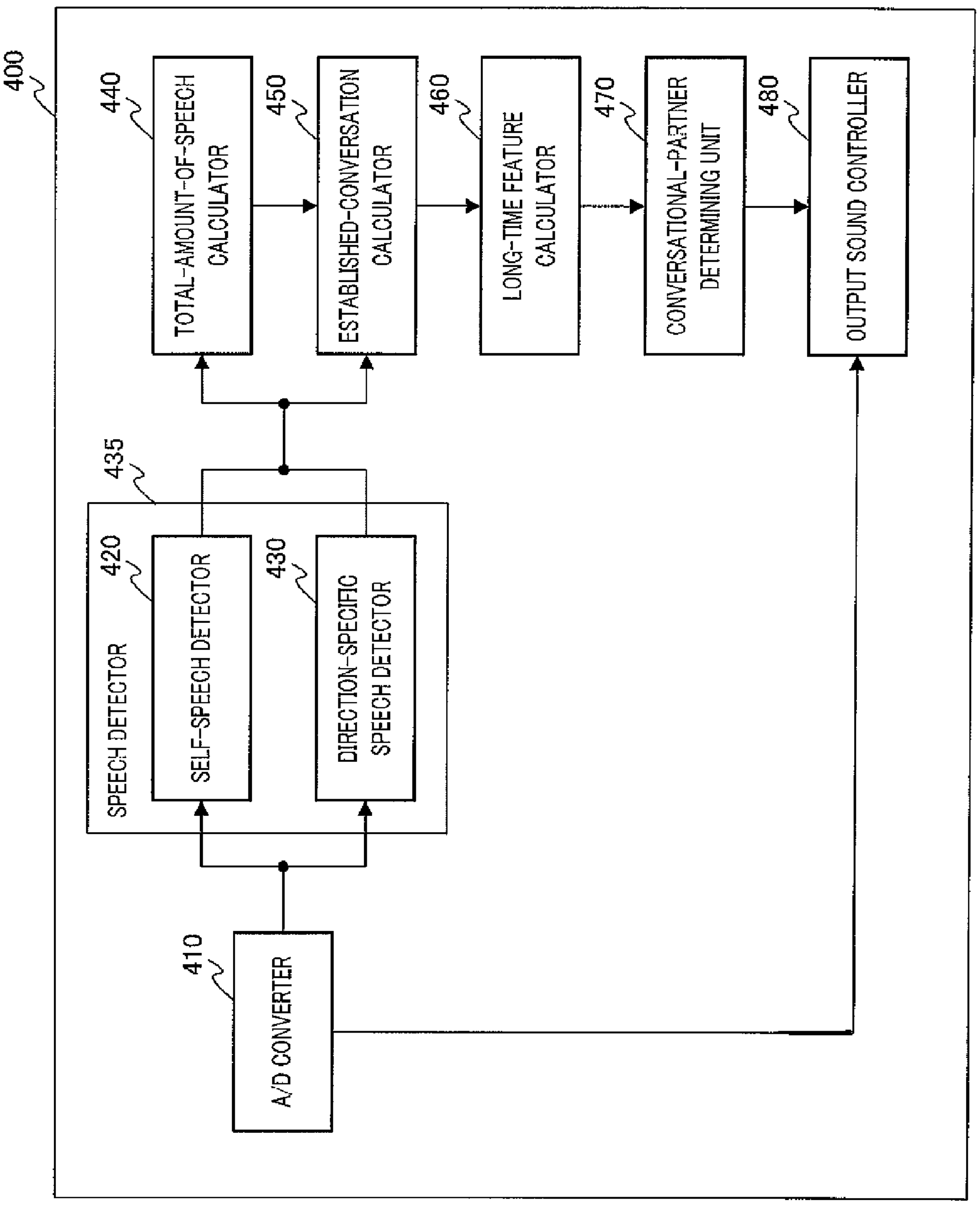
FIG. 3 is a block diagram illustrating the configuration of the speech processing device according to the embodiment.

FIG. 3 is a block diagram illustrating the configuration of the speech processing device.

Speech processing device 400 of FIG. 3 includes A/D converter 410, self-speech detector 420, direction-specific speech detector 430, total-amount-of-speech calculator 440, established-conversation calculator 450, long-time feature calculator 460, conversational-partner determining unit 470, and output sound controller 480. Self-speech detector 420 and direction-specific speech detector 430 are collectively referred to as speech detector 435.

A/D converter 410 converts four-channel acoustic analog signals picked up by the microphones of microphone array 120, into digital signals. A/D converter 410 then outputs the four-channel converted digital acoustic signals to self-speech detector 420, direction-specific speech detector 430, and output sound controller 480.

Self-speech detector 420 accentuates low-frequency vibration components in the four-channel digital acoustic signals after the A/D conversion (or extracts the low-frequency vibration components) to determine self-speech power components. Self-speech detector 420 detects speech at short time intervals from the four-channel digital acoustic signals after the A/D-conversion. Self-speech detector 420 then outputs speech or non-speech information indicating the presence or absence of self-speech in every frame to total-amount-of-speech calculator 440 and established-conversation calculator 450.

As used herein, the term "self-speech" indicates the speech of user 200 who wears hearing aid 100. Also, a time interval for the determination of the presence or absence of speech is hereinafter referred to as "frame." One frame is 10 milliseconds (msec), for example. The presence or absence of self-speech may also be determined using digital acoustic signals from adjacent two preceding and succeeding channels.

In the present embodiment, possible positions of speakers (hereinafter, referred to as "sound sources") are the front, the left, and the right of user 200, for example.

Direction-specific speech detector 430 extracts a front, a left, and a right speech from the four-channel A/D-converted digital acoustic signals through microphone array 120. Specifically, direction-specific speech detector 430 applies a known directivity control technique to the four-channel digital acoustic signals. Direction-specific speech detector 430 uses such a technique to determine the directivity for each of the front, the left, and the right of user 200 and then detects a front, a left, and a right speech. Direction-specific speech detector 430 determines the presence or absence of speech at short time intervals using the power information on the extracted direction-specific speeches and determines the presence or absence of other speech from each direction for every frame, on the basis of the results of the determination. Direction-specific speech detector 430 then outputs speech or non-speech information indicating the presence or absence of other speech of every frame and each direction to total-amount-of-speech calculator 440 and established-conversation calculator 450.

As used herein, the term "other speech" is the speech of persons other than user 200 who wears hearing aid 100 (speech other than the self-speech).

It is noted that self-speech detector 420 and direction-specific speech detector 430 determine the presence or absence of speech at the same time intervals.

Total-amount-of-speech calculator 440 calculates the total amount of speech for every segment on the basis of speech or non-speech information on self-speech received by self-speech detector 420 and speech or non-speech information on other speech from each sound source received by direction-specific speech detector 430. Specifically, total-amount-of-speech calculator 440 detects the total amount of segment-specific speech of every combination of two of the four sound sources (hereinafter, referred to as "pair") as the total amount of speech in each segment. Total-amount-of-speech calculator 440 then outputs the total amount of calculated speech of every pair in every segment to established-conversation calculator 450.

As used herein, "the amount of speech" represents a total time of speech given by the user. The term "segment" indicates a fixed-length time window for the determination of the degree of established conversation between particular two speakers. Thus, the length of the window needs to be enough to determine the established conversation between two particular speakers. A longer segment leads to a higher accuracy in the correct determination of the degree of established conversation, but a lower accuracy in following response to a change in pair to speak. In contrast, a shorter segment leads to a lower accuracy in the correct determination of the degree of established conversation, but a higher accuracy in following response to a change in pair to speak. In this embodiment, one segment corresponds to 40 seconds, for example. This length depends on the preliminary experimental results indicating that the degree of established conversation saturates within about one minute, and the following response of the flow of conversation.

Established-conversation calculator 450 calculates the degree of established conversation for every pair in every segment on the basis of the total amount of speech from total-amount-of-speech calculator 440 as well as the speech or non-speech information from self-speech detector 420 and direction-specific speech detector 430. Established-conversation calculator 450 then outputs the total amount of the received speech and the calculated degrees of established conversation to long-time feature calculator 460.

As used herein, "the degree of established conversation" is an index value similar to the degree of established conversation used in the conventional techniques, and increases with an extending time period over which one gives sound while the other is silent; on the other hand, the value decreases with an extending time period over which both speakers give sound or are silent. Unlike conventional techniques, the present embodiment determines a segment having a total amount of speech under a threshold as the period during which both speakers are listeners, and excludes the degree of established conversation therebetween from a target for the calculation of a long-time feature described later.

Long-time feature calculator 460 calculates a long-time feature for every pair on the basis of the total amount of the received speech and the degrees of established conversation. Long-time feature calculator 460 outputs the calculated long-time features to conversational-partner determining unit 470.

The term "long-time feature" refers to the average of the degrees of established conversation in a determination time period. Note that the long-time feature may also be other statistics such as the median or the mode of the degrees of established conversation, instead of the average. The long-time feature may also be the weighted average determined by placing a greater weight on the degrees of more recent established conversation or the moving average of values obtained by multiplying the time series of the degrees of established conversation by a significantly long time window.

Conversational-partner determining unit 470 extracts a conversation group from a plurality of speakers (including user 200) positioned at a plurality of sound sources on the basis of the received long-time features. Specifically, conversational-partner determining unit 470 determines speakers of one or more pairs to be one conversation group in the case where the pairs have similar long-time features, each of which is equal to or greater than a threshold. Conversational-partner determining unit 470 of the present embodiment extracts the direction of a conversational partner of user 200 and outputs information on the extracted direction to output sound controller 480 as directional information indicating the directivity to be determined.

Output sound controller 480 performs the above-described hearing-assistance processing on the received acoustic signals and outputs the processed acoustic signals to speakers 130L and 130R. Output sound controller 480 also controls the directivity of microphone array 120 so as to adjust the array toward the direction indicated by the received directional information.

Speech processing device 400 can extract a conversation group from a plurality of speakers on the basis of the total amount of speech and the degrees of established conversation for every pair in this manner.

The total amount of speech, the degree of established conversation, and the long-time feature will now be described.

Figure 4:
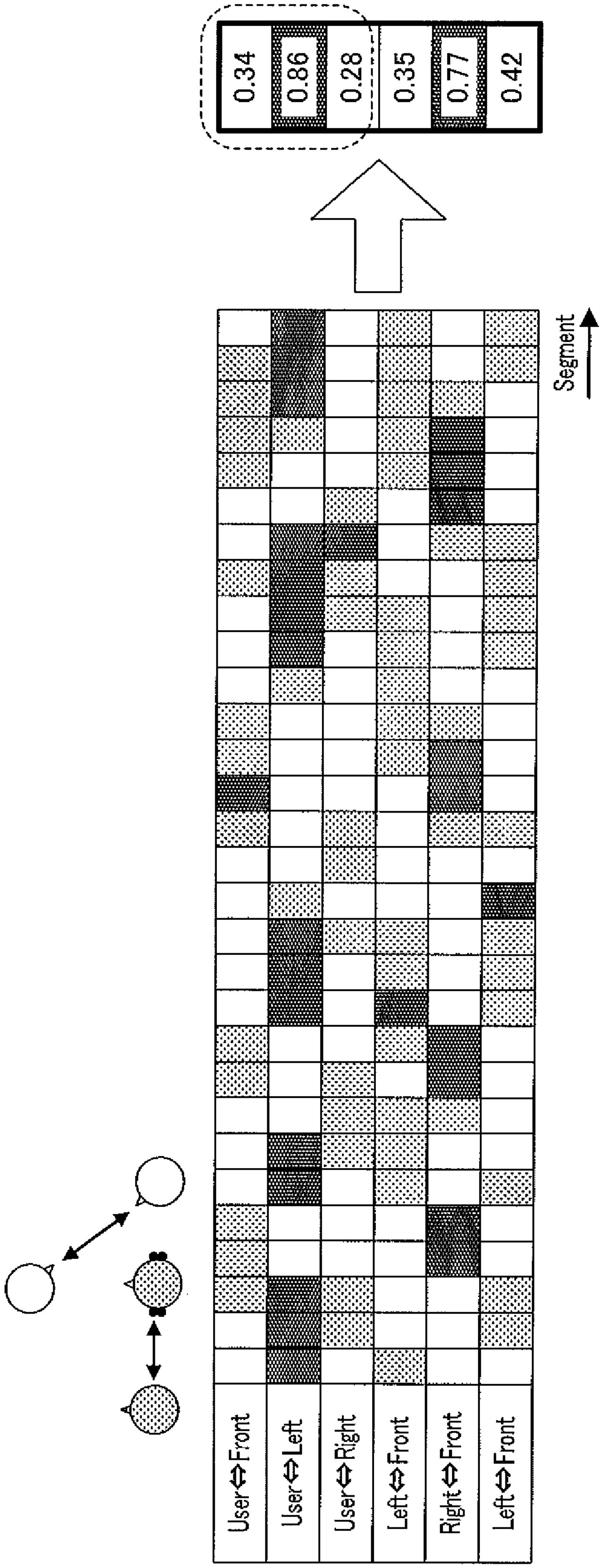
FIG. 4 is a first diagram for illustrating a relationship between the degrees of established conversation and conversation groups in the embodiment.
Figure 5:
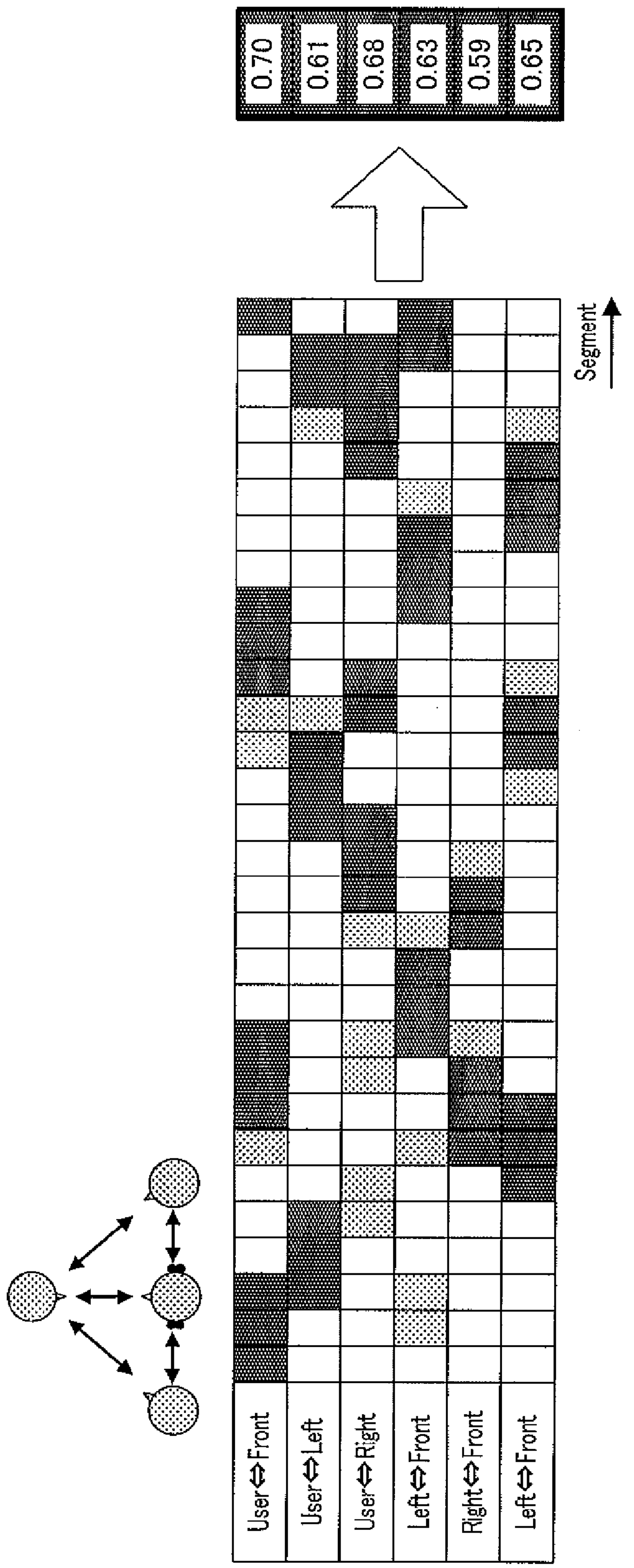
FIG. 5 is a second diagram for illustrating a relationship between the degrees of established conversation and a conversation group in the present embodiment.

FIGS. 4 and 5 explain the relationships between the degrees of established conversation and conversation groups. In FIGS. 4 and 5, the rows refer to segments (i.e., time periods) in a determination time period, and the columns refer to individual pairs. Gray cells refer to segments having a total amount of speech smaller than the threshold. White cells refer to segments having a total amount of speech equal to or greater than the threshold and a degree of established conversation smaller than the threshold. Black cells refer to segments having a total amount of speech and a degree of established conversation both equal to or greater than the respective thresholds.

A first case relates to conversation between the user and a speaker on the left thereof, and conversation between a speaker in front of and a speaker on the right of the user. In this case, the pair of user 200 and the left speaker (the second row from the top) and the pair of the front and right speakers (the fifth row from the top) create a large number of segments having a total amount of speech and the degree of established conversation both equal to or greater than the thresholds, as illustrated in FIG. 4. In contrast, the other pairs create a small number of such segments.

A second case relates to conversation among user 200 and three speakers in front, on the left and right thereof, respectively. In the case of conversation among three persons or more, while one speaks after another the other speaker(s) is/are listener(s). That is, the speakers can be classified into two persons to speak and the other(s) to hear within a short time period. The conversation goes on with pairs to speak switching for a long time period.

That is, the degree of established conversation is higher between particular two persons to speak in a conversation group of three or more persons. As a result, all the pairs uniformly give segments having a total amount of speech equal to or smaller than the threshold and segments having a total amount of speech and a degree of established conversation both equal to or greater than the thresholds, as illustrated in FIG. 5.

Thus, speech processing device 400 calculates the long-time features of only segments having a total amount of speech equal to or greater than the threshold and determines a speaker group having uniformly high long-time features to be a conversation group.

Speech processing device 400 in FIG. 4 therefore determines only the left speaker to be a conversational partner of user 200 and narrows the directivity of microphone array 120 to the left. Speech processing device 400 in FIG. 5 determines the front, left, and right speakers to be conversational partners of user 200 and widens the directivity of microphone array 120 to a wide range over the left and the right.

Figure 6:
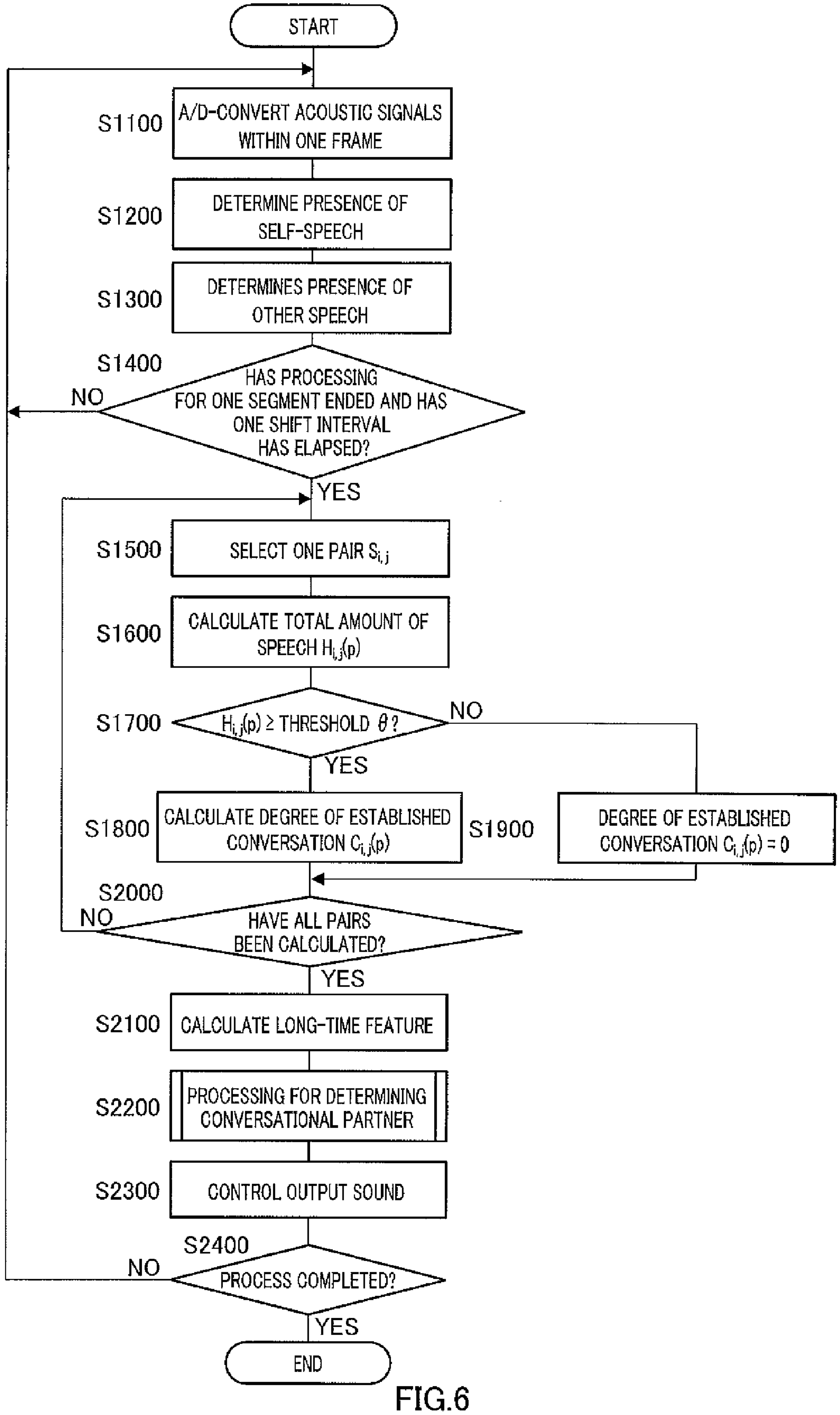
FIG. 6 is a flow chart illustrating the operation of the speech processing device according the embodiment.

FIG. 6 is a flow chart illustrating the operation of speech processing device 400.

First, A/D converter 410 A/D-converts four-channel acoustic signals within one frame received via microphone array 120 in step S1100.

Second, self-speech detector 420 determines the presence of self-speech in a present frame using four-channel digital acoustic signals in step S1200. The determination is based on self-speech power components obtained by accentuating low-frequency components of the digital acoustic signals. Namely, self-speech detector 420 outputs speech or non-speech information indicating the presence or absence of self-speech.

Speech processing device 400 desirably determines whether a conversation is being held at the start of the processing. If the conversation is being held, speech processing device 400 desirably controls the directivity of microphone array 120 so as to depress sound behind user 200. The determination may be based on self-speech power components, for example. Speech processing device 400 may also determine whether the sound behind is speech and depress only the sound in the direction from which speech comes. Speech processing device 400 may also omit such control in a quiet environment.

Direction-specific speech detector 430 then determines the presence of other speech from each of the front, the left, and the right in a present frame using the four-channel digital acoustic signals after the A/D conversion in step S1300. The determination is based on power information on a voice band (for example, 200 to 4000 Hz) for each direction in which the directivity is determined. Namely, direction-specific speech detector 430 outputs speech or non-speech information on the presence of other speech from the sound sources in the respective directions.

Direction-specific speech detector 430 may also determine the presence of other speech on the basis of a value obtained by subtracting the logarithm of self-speech power from the logarithm of the power in each direction in order to reduce the influence of self-speech. Direction-specific speech detector 430 may use the difference between the left and right powers of other speech to achieve better separation from self-speech and other speech from the front. Direction-specific speech detector 430 may also smoothen the power along the temporal axis. Direction-specific speech detector 430 may further treat a short speech period as a non-speech period and a short non-speech period as a speech period if the non-speech period is in the long duration of speech. Such post-processing can improve the accuracy in detecting the final sound or silent states for each frame.

Total-amount-of-speech calculator 440 then determines whether a predetermined condition is satisfied in step S1400. The predetermined condition includes an elapsed time of one segment (40 seconds) from the start of inputting acoustic signals and an elapsed time of one shift interval (for example, 10 seconds) has elapsed from the previous determination of a conversational partner described later. If total-amount-of-speech calculator 440 determines that processing for one segment has not been completed (S1400: No), then the process returns to step S1100. As a result, the next one frame is processed. If total-amount-of-speech calculator 440 determines that processing for the first one segment is completed (S1400: Yes), then the process proceeds to step S1500.

That is, after acoustic signals for one segment (40 seconds) are prepared, speech processing device 400 repeats the processing in steps S1500 to S2400 while shifting a particular time window for one segment at fixed shift intervals (10 seconds). Note that the shift interval may also be defined by the number of frames or the number of segments, instead of the time length.

Speech processing device 400 uses a frame counter "t," a segment counter "p," and a much-speech segment counter "$g_{i,j}$" indicating the number of segments having a large total amount of speech for each pair of the sound sources, as variables for calculation.

Speech processing device 400 sets "t=0, p=0, and $g_{i,j}$=0" at the start of the determination time period. Speech processing device 400 then increments the frame counter by one each time the processing proceeds to step S1100 and increments the segment counter "p" by one each time the processing proceeds from step S1400 to step S1500. That is, the frame counter "t" indicates the number of frames from the start of the processing, and the segment counter "p" indicates the number of segments from the start of the processing. Speech processing device 400 also increments the much-speech segment counter $g_{i,j}$ of a corresponding pair by one each time the processing proceeds to step S1800 described later. That is, much-speech segment counter $g_{i,j}$ indicates the number of segments having the total amount of speech for each pair $H_{i,j}(p)$ described later, equal to or greater than a predetermined threshold θ.

Hereinafter, a present segment is denoted by "Seg (p)." The symbol "S" is used for denoting the four sound sources including user 200, and the subscripts "i,j" are used for identifying the sound sources.

Total-amount-of-speech calculator 440 selects one pair $S_{i,j}$ from the sound sources in step S1500. The succeeding processing in step S1600 to S1900 is targeted for every combination of the four sound sources including user 200. In this embodiment, the four sound sources are a sound source of self-speech, and a front sound source, a left sound source, and a right sound source of the other speeches. In addition, the self-speech sound source is $S_0$, the front sound source is $S_1$, the left sound source is $S_2$, and the right sound source is $S_3$. This case involves the processing of the following six combinations, $S_{0,1}$, $S_{0,2}$, $S_{0,3}$, $S_{1,2}$, $S_{1,3}$, and $S_{2,3}$.

Total-amount-of-speech calculator 440 then calculates the total amount of speech $H_{i,j}(p)$ in a present segment Seg (p) using sound-source-specific speech or non-speech information on the pair (i,j) of sound sources $S_{i,j}$ in a previous one segment in step S1600. The total amount of speech $H_{i,j}(p)$ is sum of the number of frames in which the speech from the sound source $S_i$ is detected and the number of frames in which the speech of the sound source $S_j$ is detected.

Established-conversation calculator 450, then, determines whether the calculated total amount of speech $H_{i,j}(p)$ is equal to or greater than a predetermined threshold θ in step S1700. If established-conversation calculator 450 determines that the total amount of speech $H_{i,j}(p)$ is equal to or greater than the predetermined threshold θ (S1700: Yes), then the process proceeds to step S1800. If established-conversation calculator 450 determines that the total amount of speech $H_{i,j}(p)$ is smaller than the predetermined threshold θ (S1700: No), then the process proceeds to step S1900.

Established-conversation calculator 450 assumes both the speakers of the pair $S_{i,j}$ to speak and calculates the degree of established conversation $C_{i,j}(p)$ in a present segment Seg (p) from the speech or non-speech information in step S1800. Established-conversation calculator 450 then advances the process to step S2000.

The degree of established conversation $C_{i,j}(p)$ is calculated in the following manner, for example. Frames corresponding to the present segment Seg (p) consisting of frames for past 40 seconds are the immediately preceding 4000 frames, provided that one frame is equal to 10 msec. Thus, assuming that frames in the segment are represented by "k" (k=1, 2, 3, . . . , 4000), established-conversation calculator 450 calculates the degree of established conversation $C_{i,j}(p)$ using Equation (1), for example.

[1]

$$C_{i,j}(p) = \frac{\sum_{k=1}^{4000} V_{i,j}(k)}{4000} \quad \text{(Equation 1)}$$

where if $S_i$ gives speech and $S_j$ gives speech, $V_{i,j}(k)=-1$, if $S_i$ gives speech and $S_j$ gives no speech, $V_{i,j}(k)=1$, if $S_i$ gives no speech and $S_j$ gives speech, $V_{i,j}(k)=1$, and if $S_i$ gives no speech and $S_j$ gives no speech, $V_{i,j}(k)=-1$.

Note that established-conversation calculator 450 may assign weights different for individual pairs (i,j) to addition or subtraction values $V_{i,j}(k)$. In this case, established-conversation calculator 450 assigns greater weights to the pair of user 200 and the facing speaker, for example.

Established-conversation calculator 450 also assumes at least one of the pair (i,j) not to speak and sets the degree of established conversation $C_{i,j}(p)$ in a present segment Seg (p) to 0 in step S1900. Established-conversation calculator 450 then advances the process to step S2000.

Namely, established-conversation calculator 450 substantially does not use the degree of established conversation in the present segment Seg (p) for evaluation. It is because nonuse of the degree of established conversation in a segment in which at least one is a listener for evaluation is essential for extraction of a degree of conversation among three persons or more. Established-conversation calculator 450 may also simply avoid the determination of the degree of established conversation $C_{i,j}(p)$ in step S1900.

Established-conversation calculator 450 then determines whether the degrees of established conversation $C_{i,j}(p)$ of all the pairs have been calculated in step S2000. If established-conversation calculator 450 determines that the calculation for some of the pairs has not been finished (S2000: No), the process returns to step S1500, where a pair yet to be processed is selected, and the processing in steps S1500 to S2000 is repeated. If established-conversation calculator 450 determines that the calculation for all the pairs has been finished (S2000: Yes), the process proceeds to step S2100.

Long-time feature calculator 460 uses Equation (2), for example, to calculate a long-time feature $L_{i,j}(p)$ of each pair, which is the long-time average of the degrees of established conversation $C_{i,j}(p)$ within the determination time period in step S2100. In Equation (2), parameter "q" is the number of total segments accumulated within the determination time period and is also a value of the segment counter "p" in a present segment Seg (p). A value of a much-speech segment counter $g_{i,j}$ indicates the number of segments in which the total amount of speech $H_{i,j}(p)$ is equal to or greater than the predetermined threshold θ as described above.

[2]

$$L_{i,j}(p) = \frac{\sum_{q=1}^{p} C_{i,j}(q)}{g_{i,j}} \quad \text{(Equation 2)}$$

If speech processing device 400 determines that all the sound sources give no speech in a predetermined number of sequential frames, the device may reset the segment counter "p" and the much-speech segment counter $g_{i,j}$. That is, speech processing device 400 may reset these counters at the end of a certain time period of a non-conversation state. In this case, a determination time period is from the start of the last conversation to a current time.

Conversational-partner determining unit 470, then, determines a conversational partner of user 200 in step S2200. This processing for determining a conversational partner will be described in detail later.

Output sound controller 480, then, controls output sound from ear tips 140L and 140R on the basis of directional information received from conversational-partner determining unit 470 in step S2300. In other words, output sound controller 480 directs microphone array 120 toward the determined conversational partner of user 200.

FIGS. 7A to 7F illustrate example patterns on the directivity of microphone array 120.

Figure 7A:
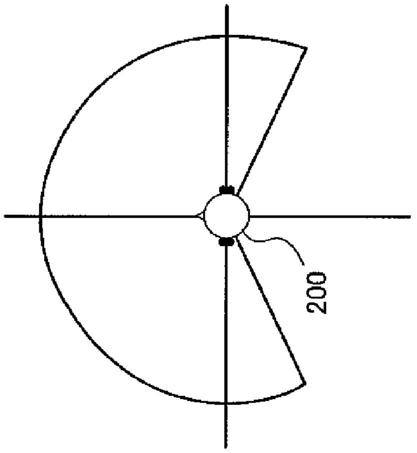
FIGS. 7A to 7F illustrate example patterns on the directivity of a microphone array in the embodiment.

First, it is assumed that directional information indicates the left, the front, and the right or directional information indicates the left and the right. In this case, output sound controller 480 controls the directivity of microphone array 120 toward a wide front range, as illustrated in FIG. 7A. In this manner, output sound controller 480 also controls the directivity of microphone array 120 toward a wide front range at the start of conversation or in the case of an undetermined conversational partner.

Figure 7B:
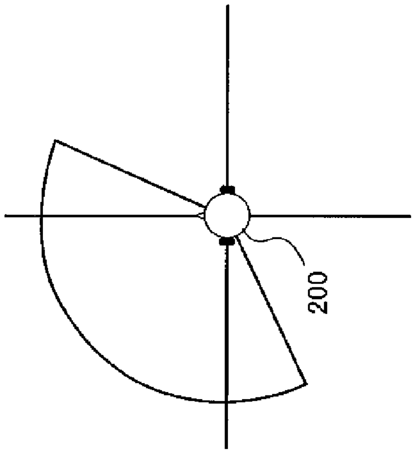

Second, it is assumed that directional information indicates the left and the front. In this case, output sound controller 480 controls the directivity of microphone array 120 toward a wide range extending diagonally forward left, as illustrated in FIG. 7B.

Figure 7C:
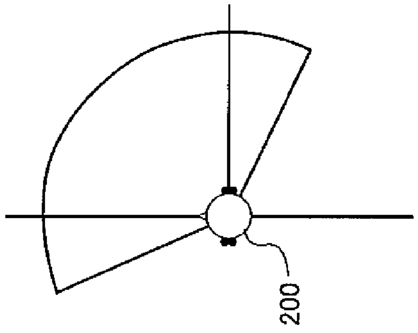

Third, it is assumed that directional information indicates the front and the right. In this case, output sound controller 480 controls the directivity of microphone array 120 toward a wide range extending diagonally forward right, as illustrated in FIG. 7C.

Figure 7D:
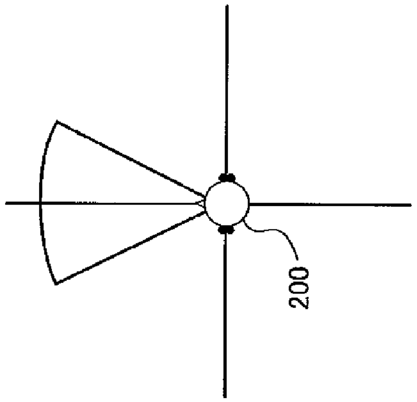

Fourth, it is assumed that directional information indicates only the front. In this case, output sound controller 480 controls the directivity of microphone array 120 toward a narrow range covering the front, as illustrated in FIG. 7D.

Figure 7E:
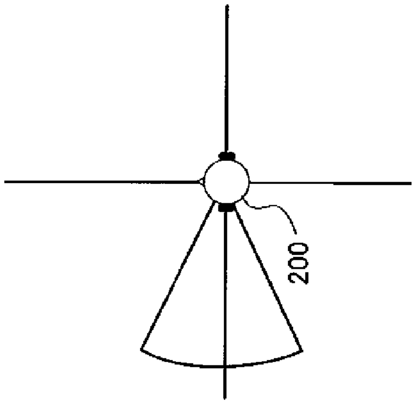

Fifth, it is assumed that directional information indicates only the left. In this case, output sound controller 480 controls the directivity of microphone array 120 toward a narrow range covering the left, as illustrated in FIG. 7E.

Figure 7F:
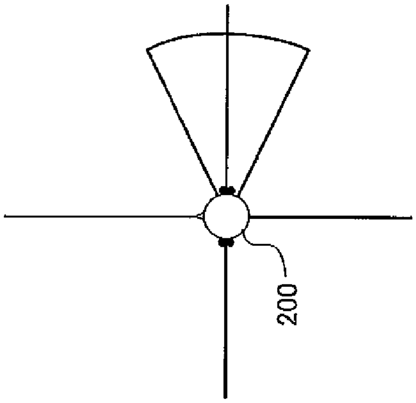

Finally, it is assumed that directional information indicates only the right. In this case, output sound controller 480 controls the directivity of microphone array 120 toward a narrow range covering the right, as illustrated in FIG. 7F.

Speech processing device 400 then determines whether a user operation instructs the device to terminate the process, in step S2400 of FIG. 6. If speech processing device 400 determines that the device is not instructed to terminate the process (S2400: No), the process returns to step S1100 and the next segment will be processed. If speech processing device 400 determines that the device is instructed to terminate the process (S2400: Yes), the device terminates the process.

Note that speech processing device 400 may successively determine whether conversation is held, and gradually release the directivity of microphone array 120 if the conversation comes to an end. The determination may be based on self-speech power components, for example.

Figure 8:
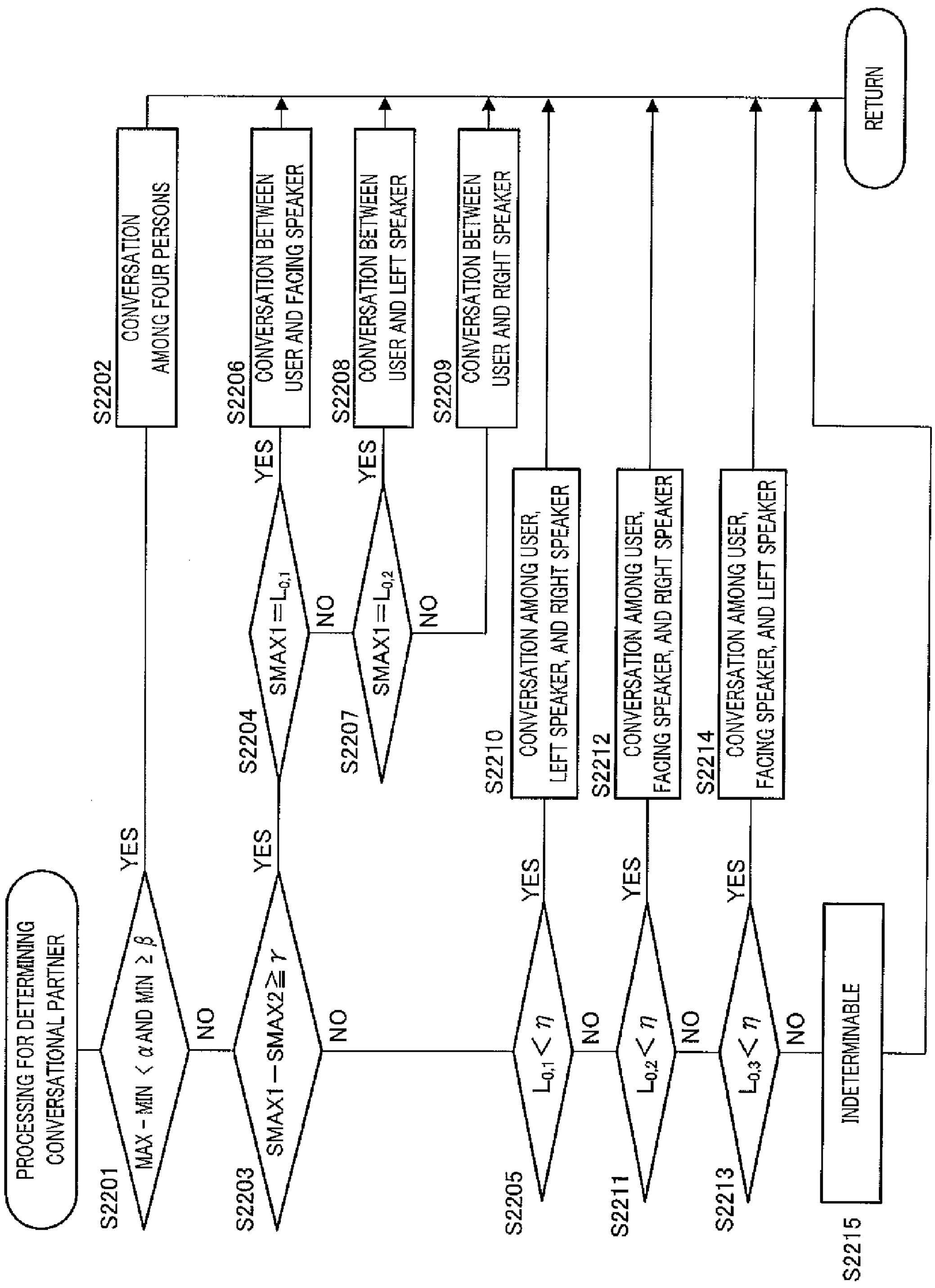
FIG. 8 is a flow chart illustrating the processing for determining a conversational partner in the embodiment.

FIG. 8 is a flow chart illustrating the processing for determining a conversational partner (step S2200 of FIG. 6).

First, conversational-partner determining unit 470 determines whether long-time features $L_{i,j}(p)$ of all the pairs are uniformly high in step S2201. Specifically, conversational-partner determining unit 470 determines whether Equation (3) involving the predetermined thresholds $\alpha$ and $\beta$ is satisfied where the maximum and the minimum of the long-time features $L_{i,j}(p)$ of all the pairs are denoted by MAX and MIN, respectively.

$$MAX-MIN<\alpha \text{ and } MIN\geq\beta \quad \text{(Equation 3)}$$

If conversational-partner determining unit 470 determines that the values of all the pairs are uniformly high (S2201: Yes), the process proceeds to step S2202. If conversational-partner determining unit 470 determines that the values of all the pairs are not uniformly high (S2201: No), the process proceeds to step S2203.

Conversational-partner determining unit 470 determines that four persons (i.e., user 200, a left speaker, a facing speaker, and a right speaker) are in conversation in step S2202, and the process returns to FIG. 6. That is, conversational-partner determining unit 470 determines the left, the facing, and the right speakers to be conversational partners of user 200 and outputs directional information indicating the left, the front, and the right to output sound controller 480. As a result, microphone array 120 is directed toward a wide range covering the front (see FIG. 7A).

Conversational-partner determining unit 470 determines whether a long-time feature $L_{i,j}(p)$ of a pair of user 200 and a particular speaker is exceptionally high, among the three pairs of user 200 and each of the other speakers, in step S2203. Specifically, conversational-partner determining unit 470 determines whether Equation (4) involving the predetermined threshold $\gamma$ is satisfied. In Equation (4), "SMAX 1" denotes the maximum of the long-time features $L_{i,j}(p)$ of all the pairs including user 200 and "SMAX 2" denotes the second highest value.

$$SMAX1-SMAX2\geq\gamma \quad \text{(Equation 4)}$$

If conversational-partner determining unit 470 determines that the value on a pair of user 200 and a particular speaker is exceptionally high (S2203: Yes), the process proceeds to step S2204. If conversational-partner determining unit 470 determines that the value on a pair of user 200 and a particular speaker is not exceptionally high (S2203: No), the process proceeds to step S2205.

Conversational-partner determining unit 470 determines whether the conversation with the exceptionally high long-time feature $L_{i,j}(p)$ is held between user 200 and the facing speaker in step S2204. That is, conversational-partner determining unit 470 determines whether SMAX 1 is the long-time feature $L_{0,1}(p)$ of the pair of user 200 and the speaker in front thereof. If conversational-partner determining unit 470 determines that the long-time feature $L_{0,1}(p)$ of the conversation between user 200 and the facing speaker is exceptionally high (S2204: Yes), the process proceeds to step S2206. If conversational-partner determining unit 470 determines that the long-time feature $L_{0,1}(p)$ of the conversation between user 200 and the facing speaker is not exceptionally high (S2204: No), the process proceeds to step S2207.

Conversational-partner determining unit 470 determines that user 200 and the facing speaker are in conversation in step S2206, and the process returns to FIG. 6. That is, conversational-partner determining unit 470 determines the facing speaker to be a conversational partner of user 200 and outputs directional information indicating the front to output sound controller 480. As a result, microphone array 120 is directed toward a narrow range covering the front (see FIG. 7D).

Conversational-partner determining unit 470 determines whether the conversation with the exceptionally high long-time feature $L_{i,j}(p)$ is held between user 200 and the left speaker in step S2207. That is, conversational-partner determining unit 470 determines whether SMAX 1 is the long-time feature $L_{0,2}(p)$ of the pair of user 200 and the speaker on the left thereof. If conversational-partner determining unit 470 determines that the long-time feature $L_{0,2}(p)$ of the conversation between user 200 and the left speaker is exceptionally high (S2207: Yes), the process proceeds to step S2208. If conversational-partner determining unit 470 determines that the long-time feature $L_{0,2}(p)$ of the conversation between user 200 and the left speaker is not exceptionally high (S2207: No), the process proceeds to step S2209.

Conversational-partner determining unit 470 determines that user 200 and the left speaker are in conversation in step S2208, and the process returns to FIG. 6. That is, conversational-partner determining unit 470 determines the left speaker to be a conversational partner of user 200 and outputs directional information indicating the left to output sound controller 480. As a result, microphone array 120 is directed toward a narrow range covering the left (see FIG. 7E).

Conversational-partner determining unit 470 determines that user 200 and the right speaker are in conversation in step S2209, and the process returns to FIG. 6. That is, conversational-partner determining unit 470 determines the right speaker to be a conversational partner of user 200 and outputs directional information indicating the right to output sound controller 480. As a result, microphone array 120 is directed toward a narrow range covering the right (see FIG. 7F).

If the process proceeds to step S2205, the conversation is neither among all the persons nor between two persons. In other words, any one of the front, the left, and the right speakers is probably a speaker unrelated to user 200.

Thus, conversational-partner determining unit 470 determines whether the long-time feature $L_{0,1}(p)$ of the pair between user 200 and the facing speaker is equal to or greater than the predetermined threshold $\eta$ in step S2205. If conversational-partner determining unit 470 determines that the long-time feature $L_{0,1}(p)$ is smaller than the threshold $\eta$ (S2205: Yes), the process proceeds to step S2210. If conversational-partner determining unit 470 determines that the long-time feature $L_{0,1}(p)$ is equal to or greater than the threshold $\eta$ (S2205: No), the process proceeds to step S2211.

Conversational-partner determining unit 470 determines that user 200, the left speaker, and the right speaker are in conversation in step S2210, and the process returns to FIG. 6. That is, conversational-partner determining unit 470 determines the left and the right speakers to be conversational partners of user 200 and then outputs directional information indicating the left and the right to output sound controller 480. As a result, microphone array 120 is directed toward a wide range covering the front (see FIG. 7A).

Conversational-partner determining unit 470 determines whether the long-time feature $L_{0,2}(p)$ of the pair of user 200 and the left speaker is equal to or greater than the predetermined threshold $\eta$ in step S2211. If conversational-partner determining unit 470 determines that the long-time feature $L_{0,2}(p)$ is smaller than the threshold $\eta$ (S2211: Yes), the process proceeds to step S2212. If conversational-partner determining unit 470 determines that the long-time feature $L_{0,2}(p)$ is equal to or greater than the threshold $\eta$ (S2211: No), the process proceeds to step S2213.

Conversational-partner determining unit 470 determines that user 200, the facing speaker, and the right speaker are in conversation in step S2212, and the process returns to FIG. 6. That is, conversational-partner determining unit 470 determines the facing and the right speakers to be conversational partners of user 200 and then outputs directional information indicating the front and the right to output sound controller 480. As a result, microphone array 120 is directed toward a wide range extending diagonally forward right (see FIG. 7C).

Conversational-partner determining unit 470 determines whether the long-time feature $L_{0,3}(p)$ of the pair of user 200 and the right speaker is equal to or greater than the predetermined threshold $\eta$ in step S2213. If conversational-partner determining unit 470 determines that the long-time feature $L_{0,3}(p)$ is smaller than the threshold $\eta$ (S2213: Yes), the process proceeds to step S2214. If conversational-partner determining unit 470 determines that the long-time feature $L_{0,3}(p)$ is equal to or greater than the threshold $\eta$ (S2213: No), the process proceeds to step S2215.

Conversational-partner determining unit 470 determines that user 200, the facing speaker, and the left speaker are in conversation in step S2214, and the process returns to FIG. 6. That is, conversational-partner determining unit 470 determines the facing and the left speakers to be conversational partners of user 200 and outputs directional information indicating the front and the left to output sound controller 480. As a result, microphone array 120 is directed toward a wide range extending diagonally forward left (see FIG. 7B).

Conversational-partner determining unit 470 concludes a conversational partner of user 200 to be indeterminable and does not output directional information in step S2215, and the process returns to FIG. 6. As a result, the directivity for output sound is maintained in the default state or a state depending on the last result of determination.

If all the speakers are in the same conversation as described above, the long-time features $L_{i,j}(p)$ of all the pairs are uniformly high. If two persons are in conversation, only a long-time feature $L_{0,j}(p)$ of the pair of user 200 and a conversational partner is exceptionally high and a long-time feature $L_{0,j}(p)$ of the pair of user 200 and the other sound sources is low.

Accordingly, speech processing device 400 can determine a conversational partner of user 200 with high accuracy and extract a conversation group including user 200 with considerable accuracy in accordance with the operation as hereinbefore described.

Since hearing aid 100 including speech processing device 400 can determine a conversational partner of user 200 with high accuracy, the device can adjust output sound to enable user 200 to readily hear the speech of the conversational partner. Hearing aid 100 can also follow a variation in the conversation group that occurs during the conversation and control the directivity in accordance with the variation. Such a variation in the conversation group occurs when, for example, one or more persons participate in conversation between two persons, resulting in conversation among three or four, or one or more participants leave conversation among four persons, resulting in conversation between two or among three persons.

Note that an abrupt change in the directivity of microphone array 120 may cause user 200 to feel significantly strange. For this reason, output sound controller 480 may also gradually vary the directivity over time. Furthermore, determining the number of conversational partners requires some time as described later. Thus, hearing aid 100 may control the directivity after the elapse of a predetermined amount of time from the start of conversation.

Also, once the directivity of microphone array 120 is determined, hearing speech from the other directions becomes hard. For example, if conversation among three persons is erroneously determined to be conversation between two persons, the speech of one speaker becomes difficult to hear. Wrong determination of a two-person conversation as a three-person one would cause less undesirable effects for the conversation of user 200 than the reverse. Thus, the thresholds $\alpha$, $\beta$, and $\gamma$ are desirably set to values capable of preventing the determination of the number of conversational partners as a smaller number than actual. That is, $\gamma$ and $\alpha$ may be set to high values and $\beta$ to a low value.

The advantages of the present invention will now be described based on the experimental results.

The experiment was conducted on speech data of 10-min conversation recorded from each of the conversation groups consisting of five groups each consisting of two speakers and five groups each consisting of three speakers. These speakers had daily conversation (chat). The start and end times of speech, which define a speech interval, were labeled in advance based on test listening. For simplicity, the experiment was aimed at measuring the accuracy in determining whether conversation was between two persons or among three persons.

A speech processing method according to the present experiment assumed one of the speakers to be user 200 and the other to be a facing speaker, as to the two-speaker conversation groups. This experiment further prepared two speakers of another conversation group and assumed one of them to be a speaker on the left of user 200.

This experiment also assumed one of the speakers to be user 200, another to be a facing speaker, and the other to be a left speaker, as to the three-speaker conversation groups.

The speech processing method according to the present invention (hereinafter, referred to as "the present invention") is based on the degree of established conversation in each segment in consideration of the amount of speech and attempted to determine a conversational partner at fixed 10-second intervals.

Figure 9:
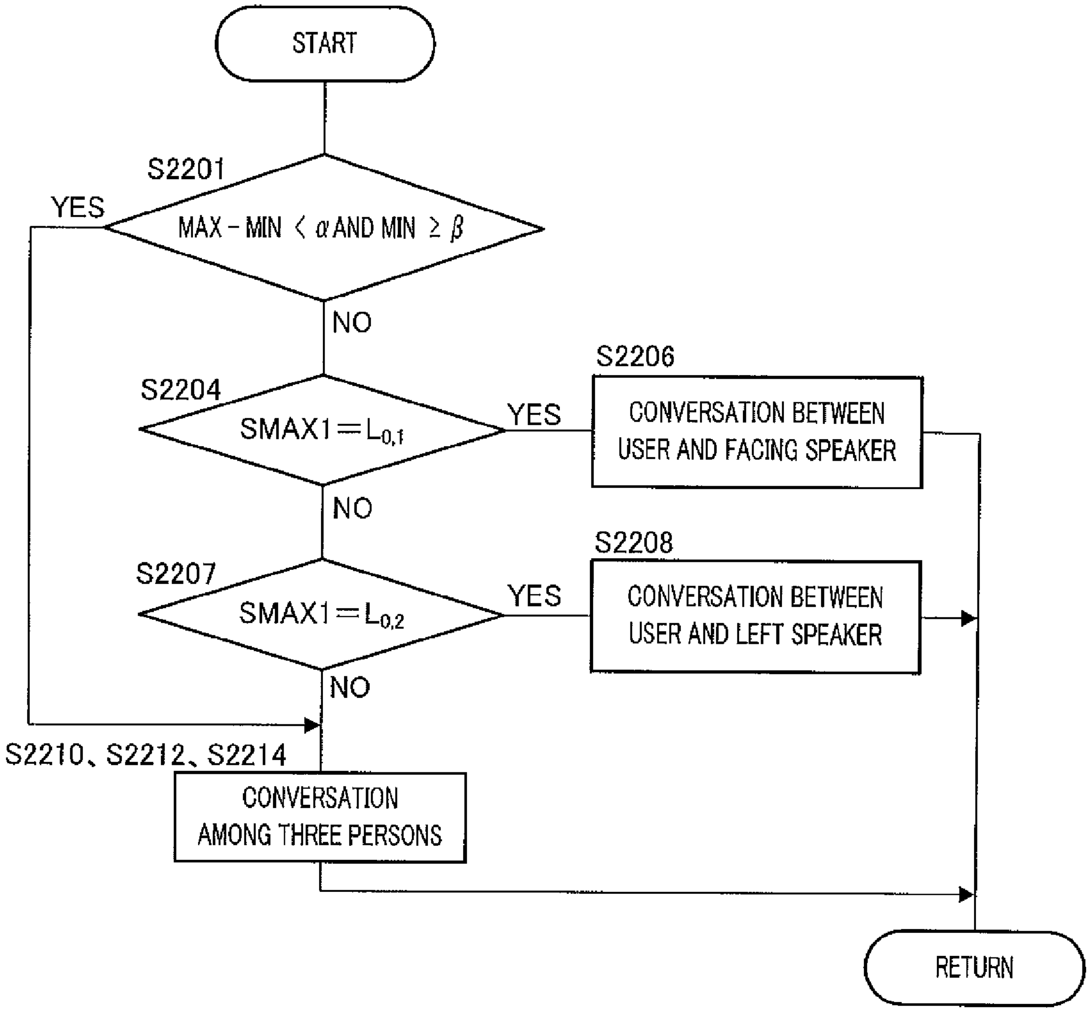
FIG. 9 is a flow chart illustrating the processing for determining a conversational partner simplified for the purpose of an experiment in the present invention.

FIG. 9 is a flow chart illustrating the processing for determining a conversational partner simplified for the experiment, and corresponds to FIG. 8. The same blocks as those in FIG. 8 are assigned the same step numbers and descriptions thereof will be omitted.

In the experiment, if conversational-partner determining unit 470 determined that long-time features $L_{i,j}(p)$ of all the pairs were uniformly high, the present invention determined that the conversation was held by all the three persons, as illustrated in FIG. 9. If the conversation was not held by the three persons, the invention determined that user 200 and any one of the left and the facing speakers were in conversation. Furthermore, if a conversational partner was indeterminable in the conversation between two persons, speech processing device 400 determined that the conversation was held among three persons to achieve high directivity.

The thresholds α and β were set to 0.09 and 0.54, respectively, in the experiment. The index value of the accuracy in extraction was defined as a rate in detecting a conversational partner, which is the average of the rate of correct detection of a conversational partner and the rate of correct filtration of a non-conversational partner.

The present invention assumed the determination of the conversation between user 200 and the facing speaker to be correct, in the case of conversation between two persons, and assumed the determination of the conversation among three persons to be correct, in the case of conversation among three persons.

It should be noted that a speech processing method according to conventional techniques (hereinafter, referred to as "conventional method") which is adopted for comparison is an extension of the method disclosed in an embodiment in PTL 1. The conventional method is specifically as follows:

The conventional method calculates a degree of established conversation from the start of conversation for every frame. The conventional method determines the degree of established conversation with a conversational partner exceeding the threshold Th to be correct and also determines the degree of established conversation with a non-conversational partner under the threshold Th to be correct, at fixed 10-second intervals. The conventional method updates the degree of established conversation using a time constant and calculates the degree of established conversation $C_{i,j}(t)$ in a frame "t" using Equation (5).

$$C_{i,j}(t)=\epsilon\cdot C_{i,j}(t-1)+(1-\epsilon)[R_{i,j}(t)+T_{i,j}(t)+(1-D_{i,j}(t))+(1-S_{i,j}(t))] \quad \text{(Equation 5)}$$

where if $S_j$ gives speech voice $$V_j(t)=i$$

if $S_j$ gives no speech voice $$V_j(t)=0$$

$$D_{i,j}(t)=\alpha\cdot D_{i,j}(t-1)+(1-\alpha)Vi(t)Vj(t)$$

$$R_{i,j}(t)=\beta\cdot R_{i,j}(t-1)+(1-\beta)(1-Vi(t))Vj(t)$$

$$T_{i,j}(t)=\gamma\cdot T_{i,j}(t-1)+(1-\gamma)Vi(t)\cdot(1-Vj(t))$$

$$S_{i,j}(t)=\Delta\cdot S_{i,j}(t-1)+(1-\delta)(1-Vi(t))(1-Vj(t))$$

$$\alpha=\beta=\gamma=0.99999$$

$$\delta=0.999995$$

$$\epsilon=0.999$$

Figure 10:
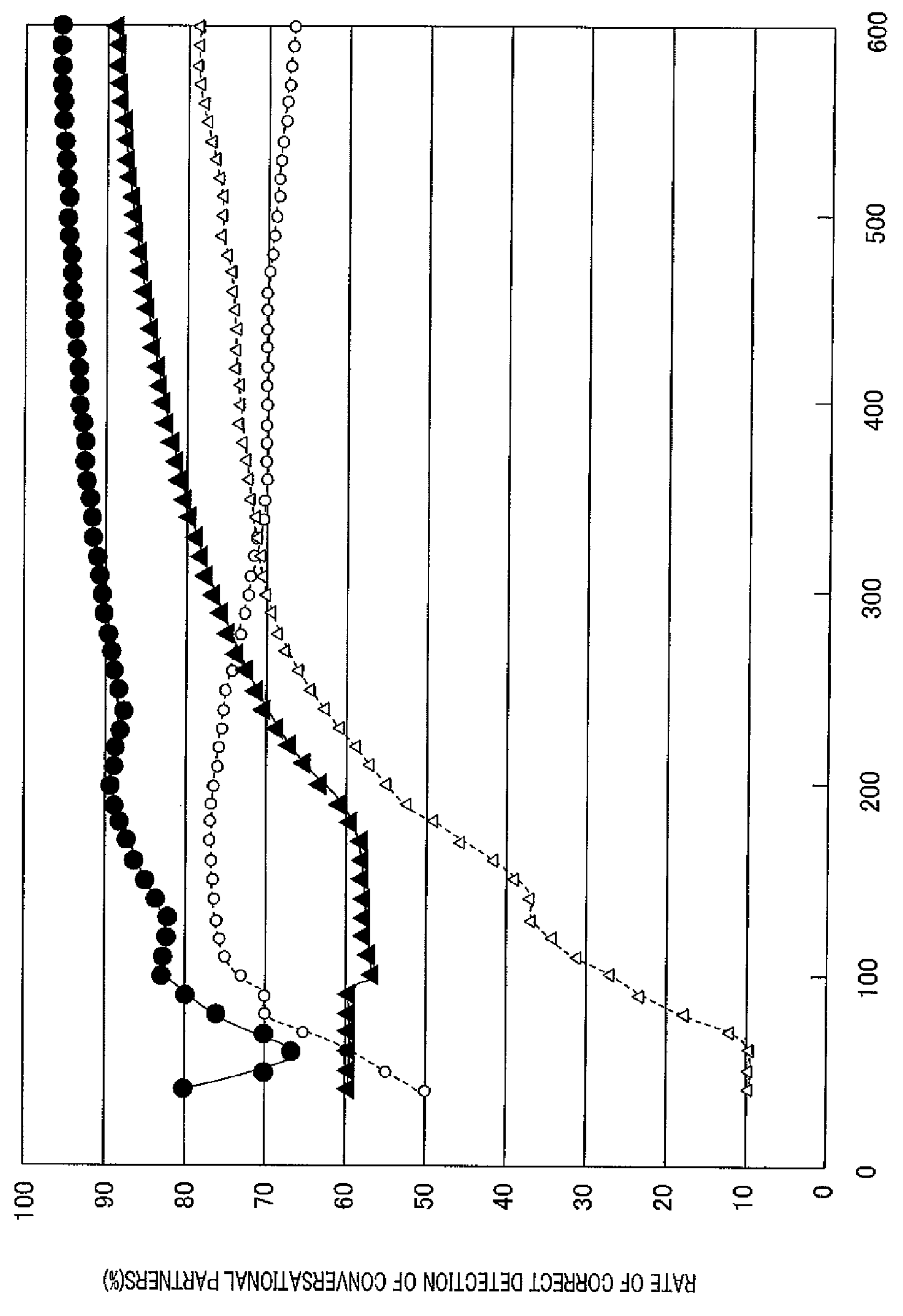
FIG. 10 is a plot illustrating experimental results in the present invention.

FIG. 10 is a plot illustrating the comparison between the rates of correct determination of conversational partners obtained by the conventional method and those obtained by the present invention. The horizontal axis in FIG. 10 indicates the elapsed time from the start of conversation, whereas the vertical axis indicates the average of the accumulated rates of correct determination of conversational partners from the start of conversation to a current time. White circles indicate experimental values on two-speaker conversation obtained in accordance with the conventional method, and white triangles indicate experimental values on three-speaker conversation obtained in accordance with the conventional method. Black circles indicate experimental values on two-speaker conversation obtained in accordance with the present invention, and black triangles indicate experimental values on three-speaker conversation obtained in accordance with the present invention.

FIG. 10 demonstrates that the present invention can far more correctly detect the conversational partners than the conventional method. In particular, the present invention detects the conversational partners with high accuracy much faster than the conventional method during the three-speaker conversation. In this manner, the present invention can extract a conversation group of three or more speakers from a plurality of speakers with high accuracy.

The conventional method uses a time constant to assign greater weights to more recent information. Nevertheless, one-to-one conversation is established typically within a relatively short time period of two or three speeches, among three persons or more. Thus, the conventional method needs a smaller time constant to detect established conversation at a point in time. Such a short time period, however, leads to a low degree of established conversation of a pair including a substantial listener who barely speaks; hence, distinguishing two-speaker conversation from three-speaker conversation is challenging and the accuracy in determining a conversational partner is lowered.

As described above, hearing aid 100 according to the present embodiment calculates the degree of established conversation of each pair while shifting a particular temporal range used for calculation and observes degrees of established conversation in segments having large total amounts of speech for a long time, thereby determining a conversational partner of user 200. As a result, hearing aid 100 according to the present embodiment can correctly determine established conversation of conversation among three persons as well as conversation between two persons including user 200. That is, hearing aid 100 according to the present embodiment can extract a conversation group of three or more speakers with high accuracy.

Since hearing aid 100 can extract a conversation group with high accuracy, hearing aid 100 can properly control the directivity of microphone array 120 to enable user 200 to readily hear the speech of a conversational partner. Since hearing aid 100 also well follows a conversation group, hearing aid 100 can attain the state to readily hear the speech of a conversational partner early after the start of conversation and maintain the state.

Note that the directivity for classifying sound sources is not limited to the above-mentioned combination of the front, the left, and the right. For example, hearing aid 100 with an increased number of microphones for allowing decreasing the angle of the directivity may control the directivity toward a larger number of directions to determine a conversational partner among more than four speakers.

Cases 110L and 110R of hearing aid 100 may also be connected to remote control device 150 by a wireless communication rather than a wired communication. Cases 110L and 110R of hearing aid 100 may also be provided with DSPs (digital signal processors) for performing some or all of the controlling in place of remote control device 150.

Hearing aid 100 may also detect speech by another method of classifying sound sources such as an independent component analysis (ICA), instead of classifying sound by directions. Alternatively, hearing aid 100 may receive speech from each speaker provided with a dedicated microphone.

Hearing aid 100 may classify sound sources using a microphone array on a table, instead of a wearable microphone. In this case, predetermining the direction of user 200 eliminates the need for detecting self-speech.

Hearing aid 100 may further distinguish self-speech from other speech on the basis of a difference in acoustic characteristics in acoustic signals. In this case, sound sources can be classified into individual speakers even from a plurality of speakers in the same direction.

Although the present invention has been applied to a hearing aid in the embodiment as hereinbefore described, the present invention can be applied to any field. For example, the present invention can be applied to various apparatuses and application software for receiving speech of multiple speakers, such as voice recorders, digital still cameras, digital video cameras, and teleconferencing systems. The results of extraction of a conversation group may be used in a variety of applications other than the control of output sound.

For example, a teleconferencing system to which the present invention is applied can adjust the directivity of a microphone to clearly output and record the speech of a speaker or detect and record the number of participants. Such a system can provide smooth progress in teleconferencing between two sites by identifying and extracting speech of a conversational partner of one location to a speaker of the other location, if input sound of one location includes interference sound, for example. Also, if both the locations have interference sounds, such a system can also detect the speech having the highest volume among speechs input to the microphones and identify the speakers at both the sites, thereby providing the same effects.

Digital recording devices such as a voice recorder to which the present invention is applied can adjust the microphone array to depress sound that interferes with speech of a conversational partner, such as the speech of conversation among others.

Furthermore, omnidirectional speech may also be recorded for every direction and thereafter speech data on a combination having a high degree of established conversation may be extracted to reproduce desired conversation, irrespective of applications.

The disclosure of the specification, the drawings, and the abstract included in Japanese Patent Application No. 2010-217192, filed on Sep. 28, 2010, is incorporated herein by reference in its entirety.

INDUSTRIAL APPLICABILITY

The present invention is useful as a speech processing device and a speech processing method that can extract a conversation group of three or more speakers from a plurality of speakers with high accuracy.

REFERENCE SIGNS LIST

100 hearing aid
110L, 110R case
120 microphone array
130L, 130R speaker
140L, 140R ear tip
150 remote control device
160 CPU
170 memory
400 speech processing device
410 A/D converter
420 self-speech detector
430 direction-specific speech detector
435 speech detector
440 total-amount-of-speech calculator
450 established-conversation calculator
460 long-time feature calculator
470 conversational-partner determining unit
480 output sound controller

The invention claimed is:

1. A speech processing device, comprising:

a speech detector that detects speech of individual speakers from acoustic signals;

a total-amount-of-speech calculator that calculates, for each of all pairs of the speakers and for each of segments defined by dividing a determination time period, a total amount of speech on the basis of the detected speech, the total amount of speech being a sum of amounts of speech of the pair of speakers in the segment;

an established-conversation calculator that calculates, for each of the pairs of the speakers and for each of the segments, a degree of established conversation on the basis of the detected speech, the degree of established conversation being a value indicating a rate of a time when one of the pair of the speakers gives speech and the other of the pair of the speakers gives no speech;

a long-time feature calculator that calculates, for each of the pairs of the speakers, a long-time feature obtained by integrating the degrees of established conversation calculated for the pair of the speakers within the determination time period; and a conversational-partner determining unit that extracts a conversation group holding conversation from the speakers, on the basis of the calculated long-time features, wherein the established-conversation calculator excludes, for each of the pairs of the speakers, the degree of established conversation of the segment with the sum of amounts of speech lower than a first threshold from the calculation of the long-time feature for the pair of the speakers, and the conversational-partner determining unit determines that the speakers of the pair with the long-time feature greater than or equal to a second threshold belong to the same conversation group.

2. The speech processing device according to claim 1, wherein the acoustic signals are acoustic signals of speech received by a speech receiving section having variable directivity, the speech receiving section being disposed close to a user being one of the speakers, and the speech processing device further comprises an output sound controller that controls the directivity of the speech receiving section toward one of the speakers other than the user of the conversation group if the extracted conversation group includes the user.

3. The speech processing device according to claim 2, wherein the output sound controller performs predetermined signal processing on the acoustic signals and outputs the acoustic signals after the predetermined signal processing to a speaker of a hearing aid on the user.

4. The speech processing device according to claim 2, wherein the speech detector detects speech of a speaker sitting in each of predetermined directions relative to the user, and the output sound controller controls the directivity of the speech receiving section toward one of the speakers other than the user in the extracted conversation group.

5. The speech processing device according to claim 1, wherein if the long-time features are uniformly high in several pairs of all the pairs, the conversational-partner determining unit determines that the speakers of the several pairs belong to the same conversation group.

6. The speech processing device according to claim 1, wherein if a difference between the highest long-time feature and the second highest long-time feature is equal to or greater than a predetermined threshold in a pair including a user, the conversational-partner determining unit determines a speaker other than the user corresponding to the highest long-time feature to be an only conversational partner of the user.

7. The speech processing device according to claim 1, wherein the determination time period is a period from the last start of conversation in which the user participates to a current time.

8. A speech processing method, comprising:

detecting speech of individual speakers from acoustic signals;

calculating, for each of all of pairs of the speakers and for each of segments defined by dividing a determination time period, a total amount of speech on the basis of the detected speech, the total amount of speech being a sum of amounts of speech of the pair of speakers in the segment;

calculating, for each of the pairs of the speakers and for each of the segments, a degree of established conversation on the basis of the detected speech, the degree of established conversation being a value indicating a rate of a time when one of the pair of the speakers gives speech and the other of the pair of the speakers gives no speech;

calculating, for each of the pairs of the speakers, a long-time feature obtained by integrating the degrees of established conversation calculated for the pair of the speakers within the determination time period; and extracting a conversation group holding conversation from the speakers on the basis of the calculated long-time features, wherein for each of the pairs of the speakers in said calculating the degree of established conversation, the degree of established conversation of the segment with the sum of amounts of speech lower than a first threshold is excluded from the calculation of the long-time feature of the pair of the speakers, and in said extracting the conversation group, the speakers of the pair of speakers with the long-time feature greater than or equal to a second threshold are determined to belong to the same conversation group.

* * * * *